(12) United States Patent
Torrie

(10) Patent No.: US 11,991,991 B2
(45) Date of Patent: May 28, 2024

(54) BEE SHELTER

(71) Applicant: Riverview Ranch Ltd., Grassy Lake (CA)

(72) Inventor: David Torrie, Grassy Lake (CA)

(73) Assignee: Riverview Ranch Ltd., Grassy Lake (CA)

(*) Notice: Subject to any disclaimer, the term of this patent is extended or adjusted under 35 U.S.C. 154(b) by 0 days.

(21) Appl. No.: 17/366,302

(22) Filed: Jul. 2, 2021

(65) Prior Publication Data

US 2022/0304283 A1    Sep. 29, 2022

(30) Foreign Application Priority Data

Mar. 26, 2021    (CA) .................................. CA 3113364

(51) Int. Cl.
*A01K 47/06*    (2006.01)
*A01K 49/00*    (2006.01)

(52) U.S. Cl.
CPC .............. *A01K 47/06* (2013.01); *A01K 49/00* (2013.01)

(58) Field of Classification Search
CPC ........ A01K 47/00; A01K 47/06; A01K 49/00; A01K 31/14; A01K 1/033; B65D 19/12; B65D 19/16; B65D 11/1833; B65D 11/1893; A63H 33/008
USPC ...... 449/4, 6, 26, 29, 30; 206/600; 220/4.28, 220/4.29
See application file for complete search history.

(56) References Cited

U.S. PATENT DOCUMENTS

| 319,979 | A | * | 6/1885 | Koch | ................. | A01K 47/00 449/26 |
| 460,219 | A | * | 9/1891 | Rutherford | ............ | A01K 47/00 449/26 |
| 1,336,523 | A | * | 4/1920 | Karpinski | .............. | A01K 47/00 449/6 |
| 2,092,155 | A | * | 9/1937 | Hackett | .................. | A01K 1/033 119/28.5 |
| 2,593,296 | A | * | 4/1952 | Green | .................... | A01K 47/00 449/13 |
| 3,291,364 | A | * | 12/1966 | Fischer | ................. | B65D 19/20 229/117.02 |

(Continued)

FOREIGN PATENT DOCUMENTS

| CH | 658769 | * | 12/1986 | |
| DE | 202011103876 U1 | * | 12/2011 | ............. A01K 47/00 |

(Continued)

*Primary Examiner* — Magdalena Topolski
(74) *Attorney, Agent, or Firm* — Finch & Maloney PLLC

(57) ABSTRACT

A bee shelter has a base and a collapsible structure. The base has a bottom surface that engages a ground surface and defines a substantially impermeable barrier above the ground surface. The collapsible structure is positioned on the base and has sidewall panels, a roof panel, and living hinges that connect the sidewall panels and the roof panel. The collapsible structure is foldable between a collapsed state and an erected state. In the collapsed state the sidewall panels and the roof panel are in a stack, and in an erected state the sidewall panels and the roof panel define an inner cavity that has an opening defined by the sidewall panels and the roof panel. The inner cavity is sheltered by the roof panel. Each of the base, the side walls, and the roof panel are water impermeable.

11 Claims, 8 Drawing Sheets

(56) References Cited

U.S. PATENT DOCUMENTS

| | | | | |
|---|---|---|---|---|
| 4,716,609 | A * | 1/1988 | Norman | A01K 47/00 449/4 |
| 4,880,141 | A * | 11/1989 | Gossler | B65D 19/20 229/122.23 |
| 4,949,414 | A * | 8/1990 | Thomas | A61G 7/0527 5/613 |
| 5,033,243 | A | 7/1991 | Worms et al. | |
| 5,211,597 | A * | 5/1993 | Scott | A01K 47/00 449/37 |
| 5,318,219 | A * | 6/1994 | Smith | B65D 19/06 206/386 |
| 5,356,014 | A * | 10/1994 | Berner | B65D 19/20 206/509 |
| 5,441,154 | A * | 8/1995 | Youell, III | B65D 19/0026 493/137 |
| 5,509,846 | A * | 4/1996 | Kueneman | A01K 47/06 449/25 |
| 5,591,063 | A * | 1/1997 | McCarthy | A01K 47/00 449/4 |
| 5,690,272 | A * | 11/1997 | England | B65D 5/001 229/915 |
| 5,741,170 | A * | 4/1998 | Orletsky | A01K 47/00 449/7 |
| 5,791,262 | A * | 8/1998 | Knight | B65D 19/0018 108/57.25 |
| 5,934,474 | A * | 8/1999 | Renninger | B65D 19/20 206/600 |
| 6,032,815 | A * | 3/2000 | Elstone | B65D 77/061 220/666 |
| 6,902,061 | B1 * | 6/2005 | Elstone | B65D 19/02 206/596 |
| 7,172,108 | B2 * | 2/2007 | Ingalls | B65D 77/061 229/117.27 |
| 7,927,178 | B2 * | 4/2011 | Alazemi | A01K 47/00 47/29.5 |
| 8,602,837 | B1 * | 12/2013 | Allan | A01K 47/00 449/27 |
| 9,475,608 | B2 * | 10/2016 | Dye | B65D 77/0413 |
| 9,930,869 | B2 * | 4/2018 | Linder | A01K 49/00 |
| D894,520 | S * | 8/2020 | Darlow | D34/38 |
| 11,160,258 | B1 * | 11/2021 | Chiles | A01K 47/06 |
| 2010/0089915 | A1 * | 4/2010 | Fukuhara | B65F 1/1468 220/4.28 |
| 2011/0283951 | A1 * | 11/2011 | Kuo | A01K 1/033 119/416 |
| 2014/0335760 | A1 * | 11/2014 | Huvermann | A01K 47/00 449/30 |
| 2017/0332608 | A1 * | 11/2017 | Pedersen | A01K 49/00 |
| 2019/0069526 | A1 * | 3/2019 | Pielemeier | A01K 47/06 |
| 2020/0113355 | A1 * | 4/2020 | Hara | A47F 5/116 |
| 2020/0323177 | A1 * | 10/2020 | Drennan | A01K 47/06 |
| 2021/0368735 | A1 * | 12/2021 | Faeth | A01K 1/0035 |

FOREIGN PATENT DOCUMENTS

| | | | | |
|---|---|---|---|---|
| DE | 202018005640 U1 | * | 3/2019 | |
| KR | 200406231 | * | 1/2006 | |
| KR | 20080010230 A | * | 1/2008 | |
| WO | WO-2009135990 A1 | * | 11/2009 | A01K 49/00 |

* cited by examiner

BEE SHELTER

TECHNICAL FIELD

This relates to bee shelters, and in particular collapsible bee shelters.

BACKGROUND

As bees are effective pollinators, it benefits farmers to encourage the development of nests or colonies in and around their crops. Leaf-cutter bees have been found to be particularly useful in pollinating alfalfa, canola, and other flowering crops. Shelters are constructed to give the bees a suitable location to establish a nest. One example of a shelter for leaf cutter bees is given in U.S. Pat. No. 5,033,243 (Worms et al) entitled "Portable shelter".

SUMMARY

According to an aspect, there is provided a bee shelter comprising a base having a top surface that is elevated above a ground surface, the base comprising a substantially impermeable barrier between the top surface and the ground surface, and a collapsible structure positioned on the top surface of the base, the collapsible structure comprising sidewall panels, a roof panel, and living hinges that connect the sidewall panels and the roof panel, the collapsible structure being foldable between a collapsed state and an erected state, wherein in the collapsed state the sidewall panels and the roof panel are in a stack, and in an erected state the sidewall panels and the roof panel define an inner cavity that has an opening defined by the sidewall panels and the roof panel, the inner cavity being sheltered by the roof panel, wherein each of the base, the side walls, and the roof panel are water impermeable.

According to other aspects, the bee shelter may comprise one or more of the following features, alone or in combination: the bee shelter may comprise at least one tray support for supporting an incubation tray within the inner cavity; the bee shelter may comprise at least one shelf adapted to support a nesting block within the inner cavity; the sidewall panels may comprise a rear panel and two side panels that extend out from the rear wall; at least one shelf may be located on rear panel, a nesting block may be positioned on the at least one shelf, the two side panels may be angled toward the nesting block such that front edges of the nesting block are engaged by the two side panels and the nesting block is clamped in place; the sidewall panels and the roof panel of the collapsible structure may be constructed from corrugated plastic having a first layer and a second layer, and the living hinges may comprise the first layer; the roof may be sloped relative to the base; a maximum height of the bee shelter may be less than 6 feet; the base, the side wall panels, and the roof panel may have selected thermal properties based on one or more environmental conditions of a location of the bee shelter; the one or more environmental conditions of the location of the bee shelter may be selected from a group consisting of: a climate, a humidity, a surrounding ecosystem, proximity to water, and a latitude of the location; and the base may comprise a series of anchor points for securing the collapsible structure and a ground anchor receptacle for anchoring the base to the ground surface.

According to an aspect, there is provided a method of constructing a bee shelter, the bee shelter comprising a collapsible structure comprising sidewall panels, a roof panel, and living hinges that connect the sidewall panels and the roof panel, the method comprising: placing a base on a ground surface, the base comprising a top surface that is elevated above a ground surface, the base defining a substantially impermeable barrier above the ground surface; folding the collapsible structure from a collapsed state, in which the sidewall panels and the roof panel are in a stack, to an erected state by folding the sidewall panels and the roof panel about the living hinges to define an inner cavity that has an opening defined by the sidewall panels and the roof, the inner cavity being sheltered by the roof panel; and attaching the collapsible structure in the erected state to the top surface of the base.

According to other aspects, the method may comprise one or more of the following features, alone or in combination: the base, the side walls, and the roof panel comprise one or more materials that are water impermeable and have selected thermal properties based on one or more environmental conditions of a location of the bee shelter; the method may comprise the step of positioning a bee incubator tray within the inner cavity, the bee incubator tray being elevated relative to the top surface of the base; and the method may comprise the step of unfolding at least one shelf from one of the sidewalls and positioning a nesting block on the at least one shelf within the inner cavity.

According to an aspect, there is provided a method of sheltering leaf cutter bees in a field, the method comprising: positioning a bee shelter at a location within the field, the bee shelter comprising a base having a top surface that is elevated above a ground surface, the base comprising a substantially impermeable barrier between the top surface and the ground surface, a structure positioned on top of the top surface of the base, the structure comprising a sidewall portion and a roof portion, the structure defining an inner cavity that has an opening defined by the sidewall portion, the inner cavity being sheltered by the roof portion, wherein a material of the base, a material of the sidewall portion, and a material of the roof portion are chosen based one or more environmental conditions at the field, and a nesting block within the inner cavity; and controlling a temperature profile within the bee shelter by orienting the bee shelter in a direction, the direction being chosen based on the one or more environmental conditions and the material of at least one of the base, the sidewall portion, and the roof portion.

According to other aspects, the method may comprise one or more of the following features, alone or in combination: the one or more environmental conditions of the location of the bee shelter may be selected from a group consisting of: a climate, a humidity, a surrounding ecosystem, proximity to water, and a latitude of the location; and controlling the temperature profile may further comprises selecting a colour of at least one of the base, the sidewall portion, and the roof portion of the bee shelter.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
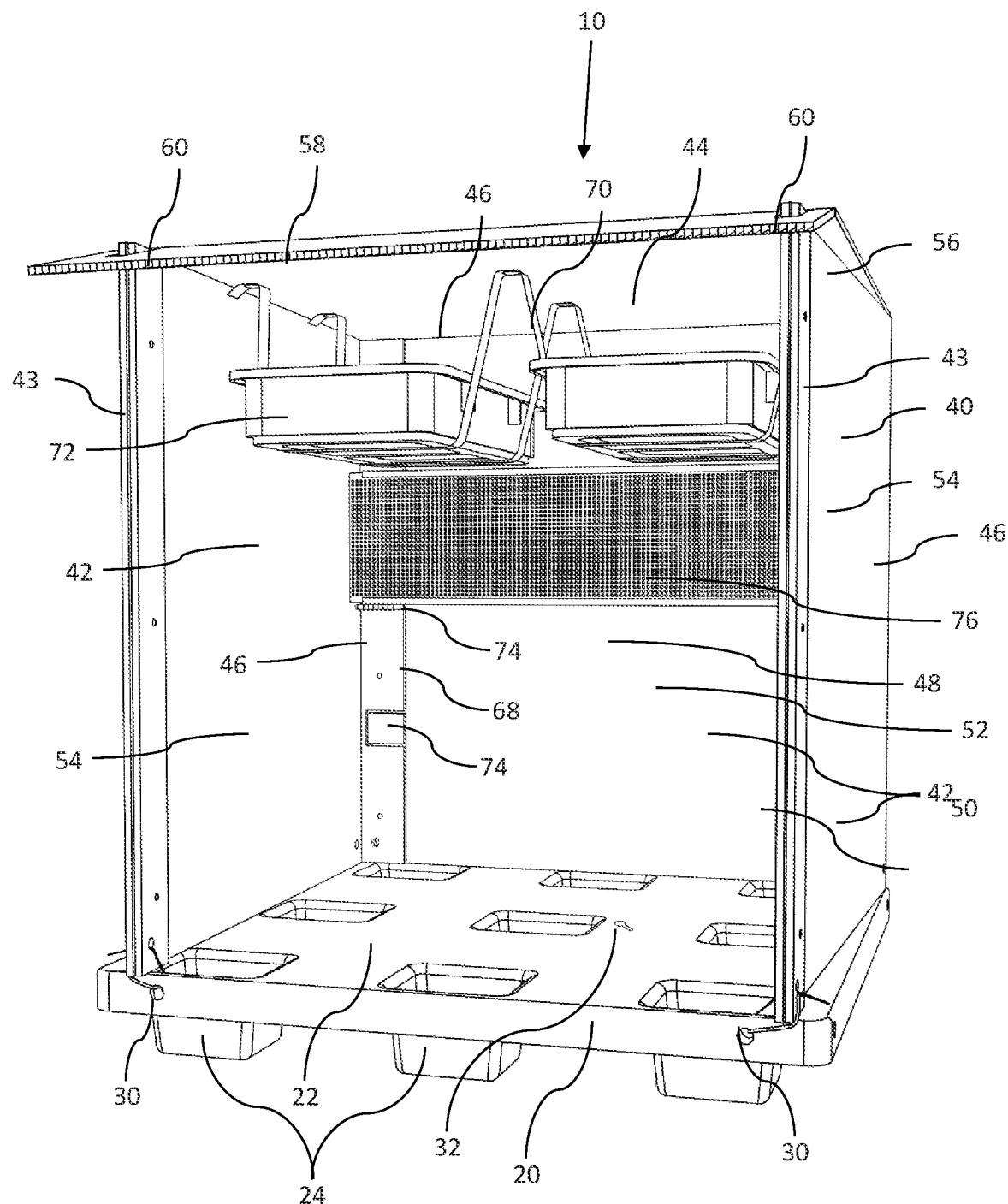
FIG. 1 is a side perspective view of an erected bee shelter.

A bee shelter, generally identified by reference numeral 10, will now be described with reference to FIG. 1 through 8. Bee shelter 10 is intended to be used as a non-permanent structure designed for use in agriculture and may be installed in a suitable location, such as in a field where crops are grown that benefit from pollination, to house nests or colonies of bees. As used herein, the term "field" describes the land on which crops are grown, as well as the area immediately adjacent to where the crops are grown, or in other words, the area around the crops being grown in which a nest of leaf cutter bees may be established using bee shelters 10 to pollinate the crops. As will be discussed below, shelters 10 may be distributed throughout the field based on a user's experience and knowledge to achieve a sufficiently effective distribution to balance the costs, such as the cost of bees, shelters, labor, etc. against the increased crop yields as a result of the improved pollination caused by the bees.

The discussion herein will be in terms of leaf cutter bees as it has been found that these bees tend to be more effective at pollinating a crop than other types of bees, such as honeybees. In addition, the nesting practices of the leaf cutter bees in commercially available nesting blocks are convenient for bee propagation for subsequent years. Shelter 10 may also be used for other types of bees that show similar benefits. Bee shelter 10 may be erected as necessary, such as at the beginning of a growing season, and collapsed down when not needed. Alternatively, bee shelters 10 may be left in place for multiple growing seasons, depending on the crops. The number of bee shelters 10 installed in a field may be selected and distributed to provide a specific density of bee population. Typically, bee shelters 10 are designed to have a sufficient height that allows the nests to be sufficiently above the ground to reduce the likelihood of damage from moisture and to protect the nests against rodents. Additionally, bee shelters 10 may be designed to be below a certain height to avoid interfering with other equipment. For example, agricultural sprinkler systems and sprayers may pass overhead. For example, bee shelter 10 may have a maximum height of about six feet, or more preferably about five feet or less, depending on the height of the equipment being used.

Figure 2:
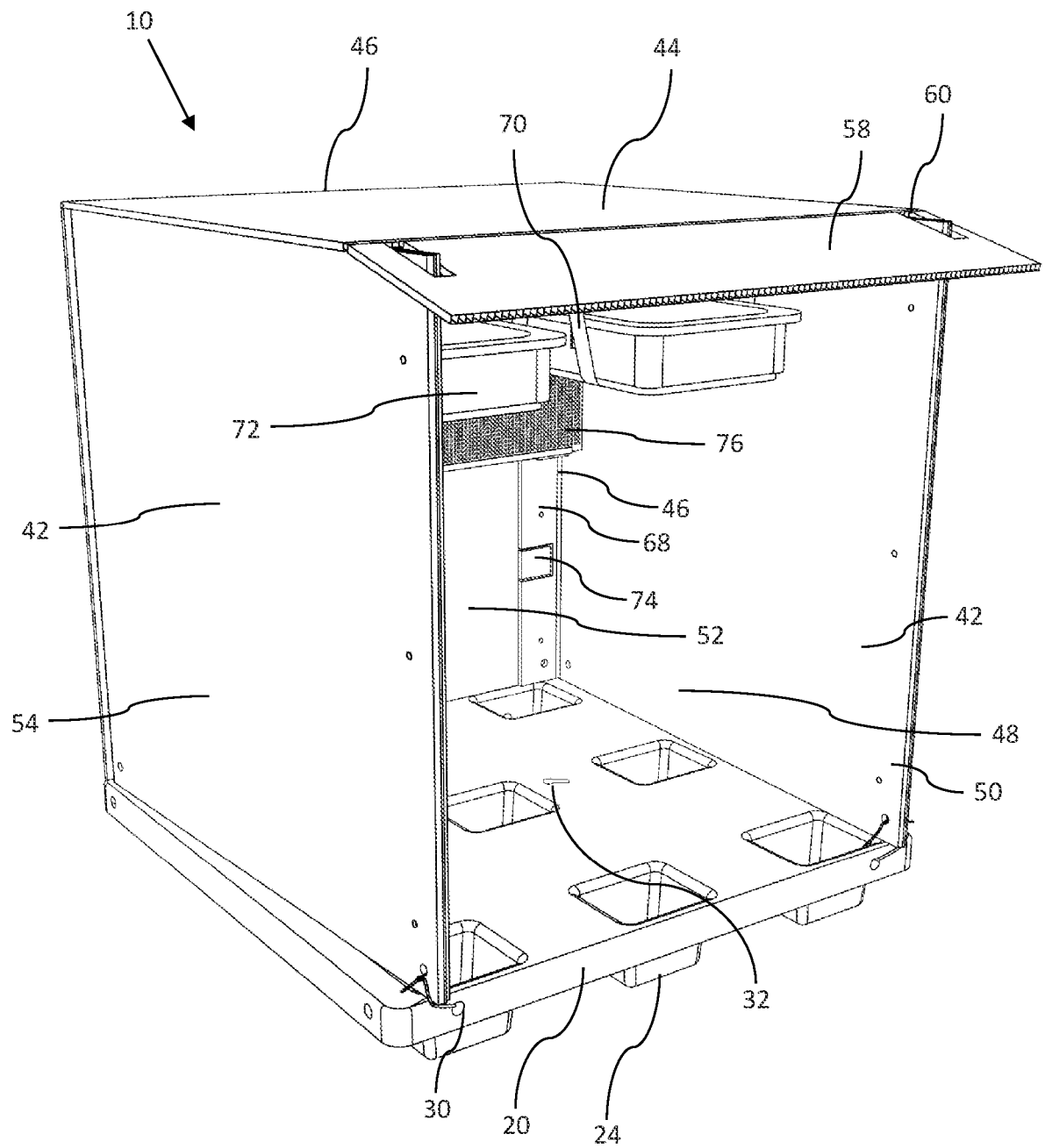
FIG. 2 is a top perspective view of an erected bee shelter.
Figure 3:
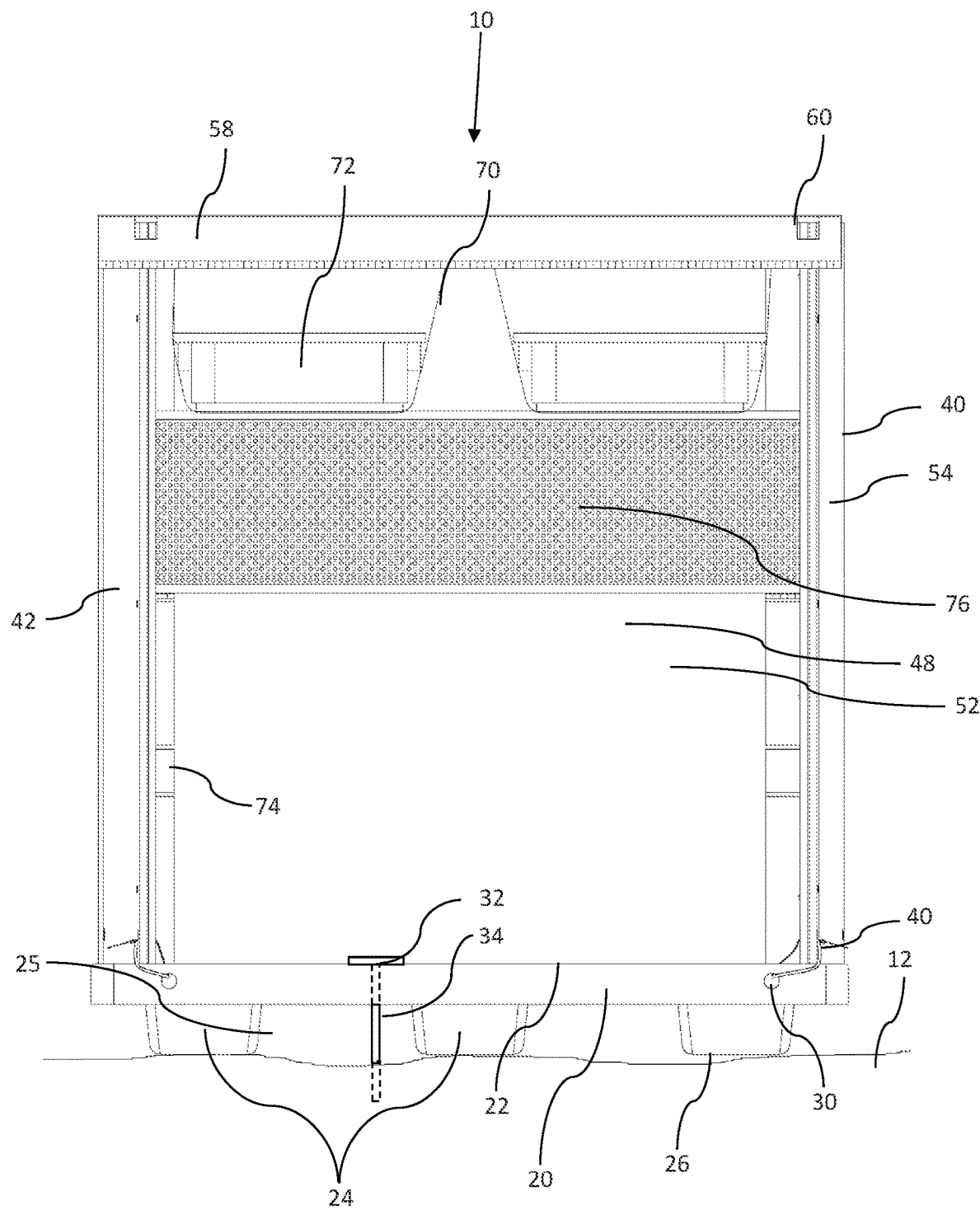
FIG. 3 is a front elevation view of a bee shelter.

Referring to FIG. 1-3, bee shelter 10 has a base 20 designed to be positioned on a ground surface 12 and a collapsible structure 40 positioned on a top surface 22 of base 20. Base 20 may have a plurality of legs 24 that contact ground surface 12 and support top surface 22 above ground surface 12. Base 20 may form a substantially impermeable barrier between top surface 22 and ground surface 12 and may be designed to provide an air gap 25 between ground surface 12 and collapsible structure 40. In this manner, base 20 may be used as an effective barrier against the moisture and/or temperature changes from the ground and to minimize plant life growth below base 20.

Figure 4:
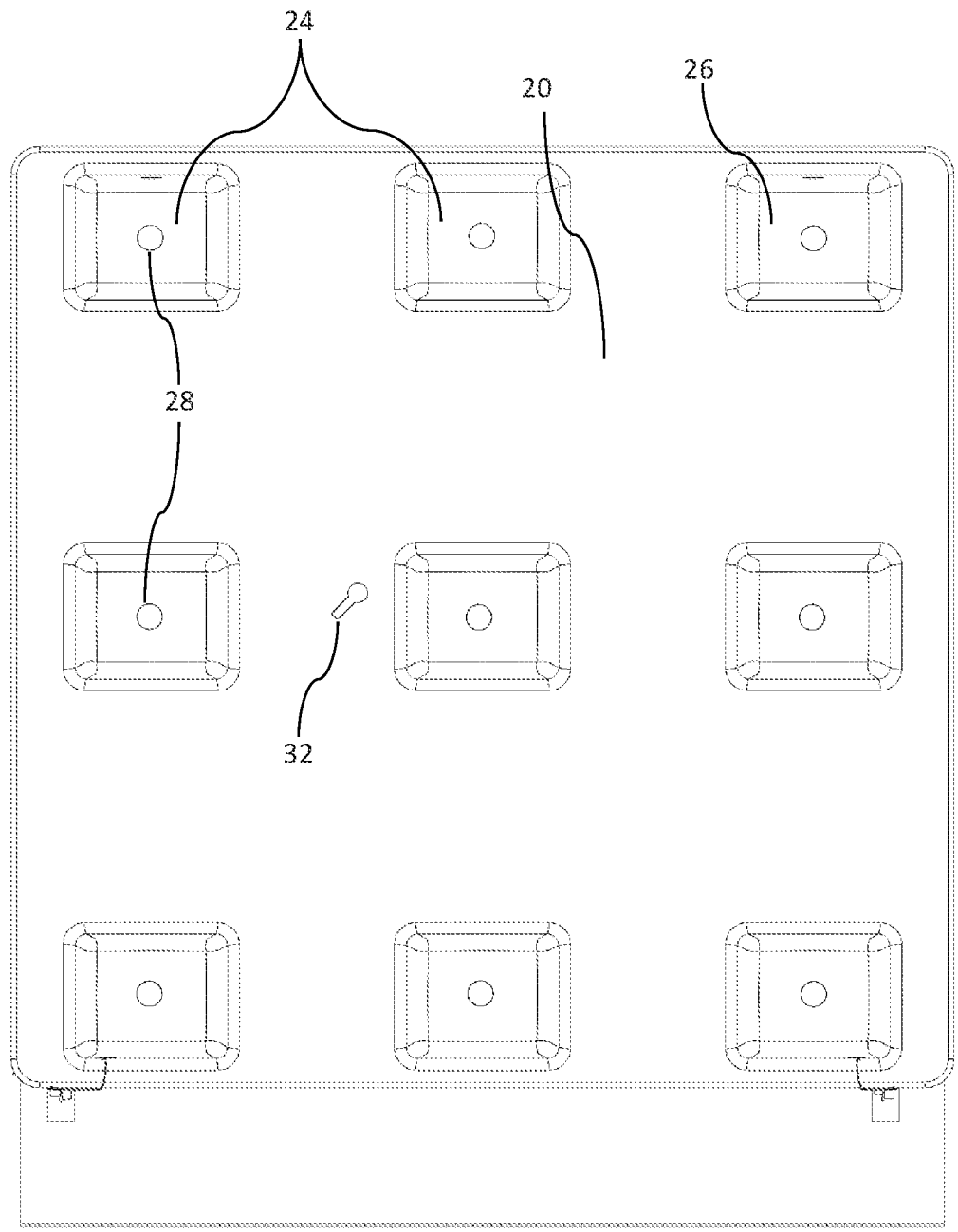
FIG. 4 is a bottom plan view of a bee shelter.

Referring to FIG. 4, legs 24 may be hollow, and may have a drain 28 at the bottom to allow any water that enters collapsible structure 40 to drain out through base 20. Drains 28 may be provided on bottom surface 26 at a point that contact ground surface 12 to prevent airflow while still allowing water to drain. Top surface 22 may be a closed surface that is impermeable. Base 20 may be made from plastic and may be moulded as a single piece. Base 20 may have a number of anchor points 30 that allow structure 40 to be attached using attachments 31. While various attachments may be used, the depicted anchor points 30 are holes in base 20 and structure 40 and attachments 31 are zip-ties, which are threaded through corresponding holes 30, and may be easily removed once structure 40 is to be collapsed. The size and strength of zip ties as well as the number of anchor points 30 and attachments 31 may be selected to provide suitable support for structure 40. and are easily installed, relatively strong, and easily removed. In addition, base 20 may be anchored to the ground, such as by providing a ground anchor opening 32 through which a ground anchor 34 (shown in FIG. 4) may extend. A suitable ground anchor 29 may be a shaft with a flight at the bottom that is screwed into the ground, and a flanged top that engages base 20. Other ground anchors may also be used, such as pegs at the corners of base 20, etc. depending on the expected forces, such as wind, to be withstood in the field.

Figure 5:
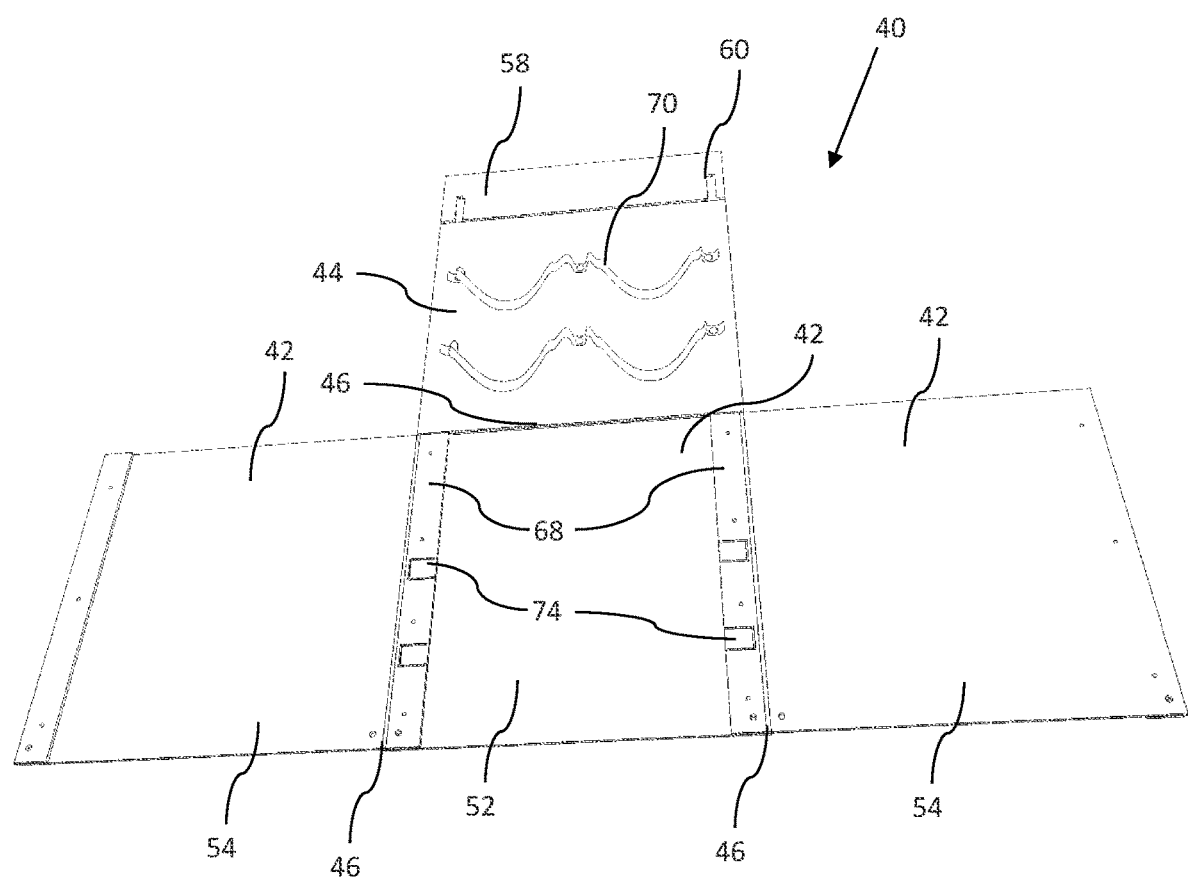
FIG. 5 is a perspective view of an unfolded bee shelter.
Figure 7:
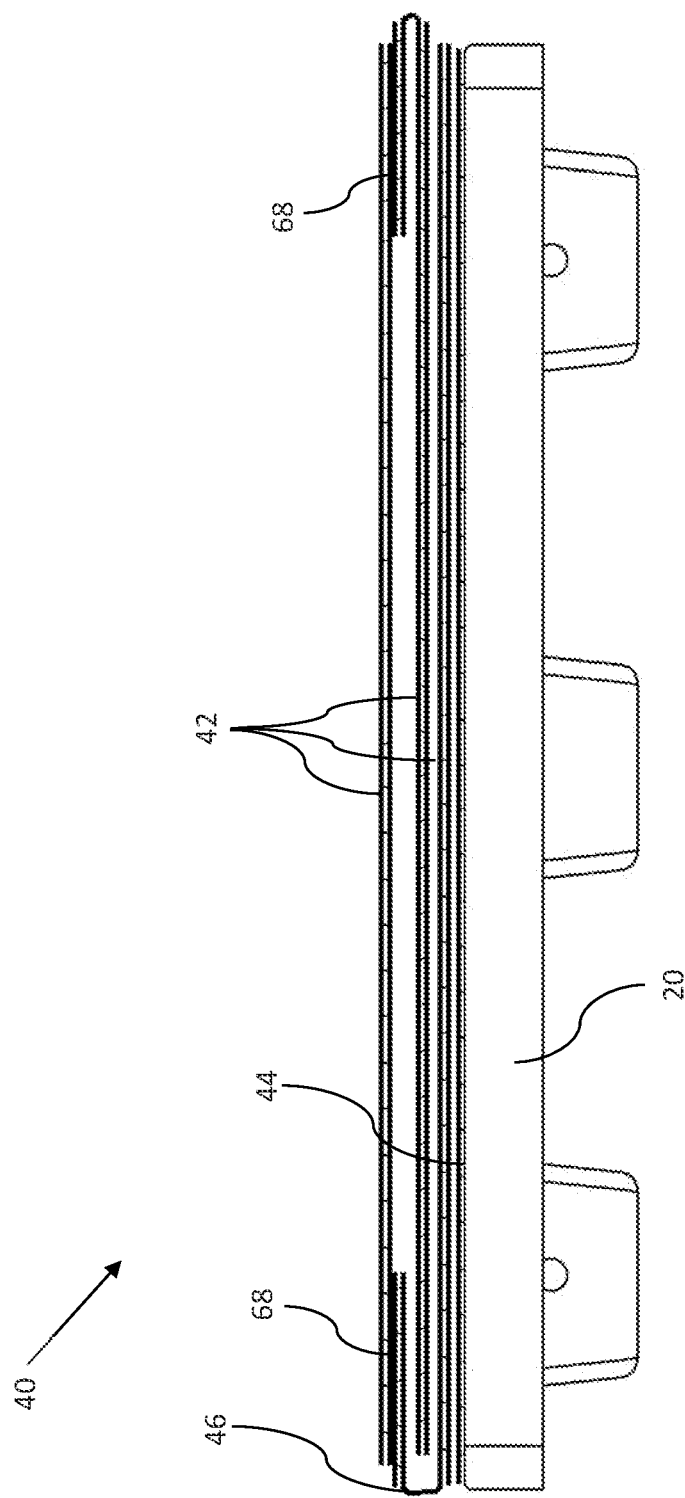
FIG. 7 is a side elevation view in section of a living hinge constructed from corrugated plastic.

Referring to FIG. 5, collapsible structure 40 has sidewall panels 42, a roof panel 44 and living hinges 46 that connect between adjacent sidewall panels 42 and roof panel 44. Collapsible structure 40 is foldable along living hinges 46 between an erected state, as shown in FIG. 1, and a collapsed state as shown in FIG. 7. Preferably, sidewall panels 42 and roof panel 44 are sized to allow them to fold into a stack while remaining attached by hinges 46. Sidewall panels and roof panel 44 may be sized to fit properly on base 20 and maximize the usage of space. Sidewall panels 42 may have reinforced edges 43, such as by attaching a stiffener, or by folding the material back on itself. The edges of sidewall panels 42 and roof panel 44 adjacent to other panels may be stiffened by hinges 46, and by the folded design.

Referring to FIG. 5, living hinges 46 are flexible pieces of material that are made from the same material as the two pieces it connects across. Living hinges 46 may be separate pieces that are attached between adjacent panels 42/44 or may be integrally with one or both panels. An advantage of attaching living hinge 46 on at least one size is the second layer of material that increases the rigidity of the hinge and the respective panel 42/44, although this additional rigidity may not be required. Using living hinges 46 is beneficial as they may be relatively inexpensively made from a polymer, are relatively easy and light, and may be integrally formed with panels 42/44 if made from the same material. In addition, living hinges 46 provide a suitable design for sealing the space between panels 42/44.

Referring to FIG. 5, sidewall panels 42 and roof panel 44 may be constructed from corrugated plastic, such as Coroplast™, which has a first layer 62 and a second layer 64 connected by internal corrugations 66 to provide additional strength and structure to the material. Corrugated plastic is commercially available in various thicknesses and has the benefit of being relatively strong for its weight. Corrugated plastic is also relatively inexpensive and inherently water impermeable and may be used to design a relatively light, stable structure 40 with rectangular-shaped side panels and at right angles, with suitable reinforcements if required, rather than other dome-shaped or A-frame designs. A rectangular structure is convenient for installing rectangular incubation trays and nests, as will be discussed below. Corrugated plastic also makes it convenient to form living hinges 46, which may be integrally formed by cutting a second layer 64, and leaving the adjacent portion of first layer 62 intact. Cuts may be conveniently made along corrugations 66 within the material, although it is also possible to cut across corrugations 66 if necessary, while still leaving sufficient material to form living hinge 46.

Figure 6:
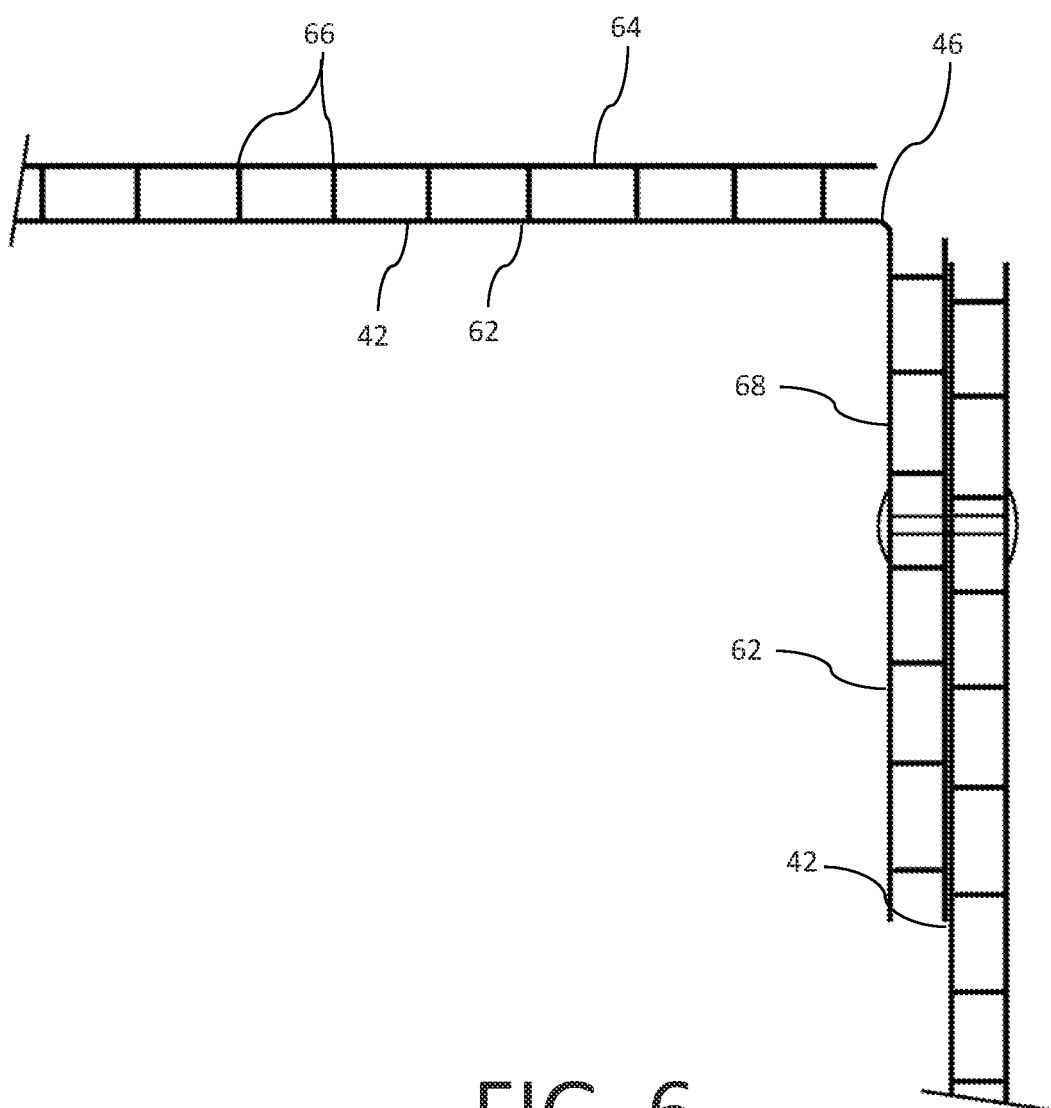
FIG. 6 is a side elevation view in section of a living hinge constructed from corrugated plastic.

Referring to FIG. 5, collapsible structure 40 may be constructed by constructing panels 42/44 separately and by forming living hinge 46 along one edge with an attachment strip 68. Attachment strip 68 is used to attach to an adjacent panel 42/44, such that the panels 42/44 are connected and may be pivoted about living hinge 46 as required. It may also be possible to form two or more panels from a single piece of corrugated plastic, in which case construction would start from larger sheets of material. One advantage of separate panels 42/44 connected by attachment strip 68 is the additional rigidity adjacent to hinge 46 provided by attaching layers together. As shown, sidewall panels 42 may be designed as having a rear panel 53 and two side panel 54 that extend from either edge of rear panel 52. Other designs may also be used that allow structure 40 to be collapsed and erected as desired. In one example, a living hinge 46 is constructed between each side panel 54 and a respective attachment strip 68, which is then fixed to rear panel 52. Attachment strip 68 may also be cut to form folding supports 74 that are also mounted using living hinges and support nesting block 76 as will be discussed below. In this example, attachments trips 68 would be attached such that they are located in the interior of structure 40. Opposite attachment strip 68, each side panel is provided with a reinforcement strip 43, which may also be formed by cutting along one layer (layer 64 as shown in FIG. 6) of corrugated plastic and doubling it over. Reinforcement strip 43 may be secured using an adhesive, rivets, or the like. Roof panel 44 may be integrally formed with rear panel 52 as shown or may be attached in the same manner as side panels 54. If integrally formed, living hinge 46 between rear panel 52 and roof panel 44 may be cut across the corrugations. In one example, it may be desirable to have the living hinge on the outside of the fold, in which case the cut across the corrugations would have to be wide enough to accommodate the desired bend without interference.

Referring to FIG. 7, sidewall panels 42 and roof panel 44 are designed to be collapsible into a stack that may be around the same width and length as base 20, which may be a convenient size and shape for storage and transport. In a collapsed state, structure 40 may be stacked with base 20 as shown, or in separate stacks if base 20 is nestable with other bases, in which case stacking them separately may require less space. In either case, a relatively large number of bases 20 and collapsible structures 40 may be stored and transported when compared with pre-fabricated structures that are not collapsible.

Referring to FIGS. 1 and 2, in the erected state, sidewall panels 42 and roof panel 44 define an inner cavity 48 that has an opening 50 defined by the front edges of side panels 54 and roof panel 44. As shown, collapsible structure 40 may have three sidewall panels 42, including a rear panel 52 opposite opening 50, and two side panels 54 extending between rear panel 52 and opening 50. It will be understood that collapsible structure 40 may be designed with a different number of panels, particularly if a more complex design or shape of structure 40 is preferred.

In order to erect structure 40, rear panel 52 is placed along a rear edge of base 20 (which may be an arbitrary edge if base 20 does not have a specific orientation), and side panels are pivoted about hinges 46 such that they are substantially aligned with side edges of base 20. Roof panel 44 is folded relative to rear panel 52 about the respective hinge 46 to be positioned above side panels 54 and rear panel 52. In one example, roof panel 44 may be folded along an outer surface of rear panel 52 in the collapsed state, such that it does not interfere with sidewall panels 42 as they are installed, and is then lifted up and over sidewall panels 42 to cover inner cavity 48.

Roof panel 44 may have an extension portion 58 that extends past opening 50 and overhangs opening 50 when collapsible structure 40 is in the erected state. Extension portion 58 may be connected to roof panel 44 by a living hinge 46 and may have slots 60 that receive side panels 54 and prevent them from pivoting relative to rear panel 52 when in the erected state.

The angles of the various panels may or may not be right angles. For example, side panels 54 may be angled inward relative to inner cavity 48 such that the remote ends underlie roof panel 44 and are received within slots 60. Alternatively, roof panel 44 may be oversized. In addition, roof panel 44 may be sloped relative to base 20 (not shown) to more easily shed water This may be done, for example, by sloping the top edges of side panels 54, either up or down relative to rear panel 52. The features of roof panel 44, including the living hinge 46 that connects to rear panel 52, the portion of roof panel 44 that extends past top edge 56 of side panels 54, and the slope of roof panel 44, may cooperate to shelter inner cavity 48 and prevent any substantial amount of water from entering inner cavity 48.

Inner cavity 48 may house at least one tray support 70 for supporting an incubation tray 72 that carries incubated bee larvae. As shown, tray support 70 may be a sling that is suspended from roof panel 44, however other implementations of tray support 70 that support an incubation tray may be used. Inner cavity 48 may also house at least one shelf 74 adapted to support one or more nesting blocks 76 within inner cavity 48. As shown, bee shelter 10 may have a plurality of shelves 74 that fold down from rear panel 52 such that nesting block 76 is disposed against rear panel 52. As discussed above, side panels 54 may be angled inward toward inner cavity 48 and may contact nesting block 76 in order to secure nesting block 76 in place. The plurality of shelves 74 may fold away from rear panel 52 such that they are stacked against rear panel when collapsible structure 40 is in the collapsed position and they can fold out when collapsible structure is in the erected position. As shown, plurality of shelves 74 may be formed in attachment strip 68.

A method of constructing bee shelter 10 will now be described. Base 20 is placed on ground surface 12 such that top surface 22 is elevated above ground surface 12. Collapsible structure 40 is folded from the collapsed state to the erected state. Each of the sidewall panels 42 and roof panel 44 are folded about living hinges 46 to define inner cavity 48 and opening 50. Sidewall panels 42 are positioned to define opening 50 and roof panel 44 is positioned to shelter inner cavity 48. Base 20 may be anchored to ground surface 12 and collapsible structure 40 may be anchored to base 20. Shelter 10 may be erected and installed for a single growing season or multiple seasons, and may be collapsed by reversing the process described above.

Bee incubator trays 72 may be positioned within inner cavity 48 and may be supported in an elevated position relative to top surface 22 of base 20. A nesting block 76 may be positioned within inner cavity 48 and may be placed on one or more shelves 74. The one or more shelves 74 may be folded down from rear panel 52 and nesting block 76 placed on folded down shelves 74. Side panels 54 may be angled inward toward nesting block 76 such that they contact nesting block 76 and secure it in position. Incubator trays 72 and nesting block 76 may be positioned within inner cavity 48 together or individually. Typically, incubator trays 72 will be installed at the beginning of the season with incubated bees, who then exit trays 72 and form nests in nesting block 76. It has been found that, by suspending nesting blocks 76 above base 20, and with appropriate selection of corrugated plastic, nesting blocks 76 may be protected against damage from rodents such as mice as they are unable to climb sidewalls 42.

In order to provide suitable conditions for the bees within shelter 10, the materials selected for each of base 20, sidewalls 42, and roof panel 44 may be water impermeable, and in some examples, to have desired thermal properties. The selected thermal properties may be a result of the material each component is made from, a colour of the material chosen, a texture or finish of the material, the material itself, the thickness of the material, or other aspects of the component that can be altered to affect the thermal properties. For example, different colors and different finishes may affect the amount of solar radiation that is absorbed or reflected, while the heat capacity may affect how much heat is stored, how quickly the heat is dissipated, the amount of insulation that is provided, etc. Depending on the climate and other environmental conditions, shelter 10 may be designed to provide a temperature range that is more suitable for bees. In designing shelter 10, each of base 20, sidewalls 42, and roof panel may have the same or different thermal properties, and the selected thermal properties may be based on one or more environmental conditions of a location of bee shelter 10, which may include the location of the field, or even a location within the field. For example, it may be desired to design base 20 to provide more or less insulation to prevent or allow heat to pass between the inner cavity 48 and the ground surface. The environmental conditions may include the climate, humidity, surrounding ecosystem, proximity to water, latitude, etc. For example, the sunrise and sunset times, and projected temperature throughout the day and night may be considered in improving the conditions within shelter 10. For example, orienting opening 50 of shelter 10 toward the sun may warm inner cavity 48 more quickly in the morning. This can be accelerated by using a material for base 20 that absorbs heat from the sun. During the heat of the day, when the sun is at its highest, base 20 may be sheltered from the sun and roof panel 44, which may be a heat reflective material, such as by making it from white material, to prevent excessive heat within inner cavity 48. Sidewall panels 42 may also be selected based on their exposure to the sun, and whether heat is to be absorbed, reflected, conducted, or stored. For example, rear panel 52 may be a darker color to absorb more heat as the sun sets to keep the temperature within inner cavity 48 warmer longer once the heat of the day starts to wane. It will be understood that, in different climates, the temperature within inner cavity 48 may be controlled in different ways. Suitable combinations of the materials used to construct shelters 10 and their orientation once installed may be determined by experimentation and testing, such as by providing temperature sensors in and around shelters 10, observing the collected data over a growing season, and observing the impact on the bees, including the effect on their nesting and pollination of the adjacent crops. It has been found, for example, that shelters closer to the center of an irrigated field tend to be cooler than shelters away from the center, where the field is irrigated by a sprinkler that rotates about a central point of the field. This may be due to the proximity to the source of water, which tends to be cooler.

Figure 8:
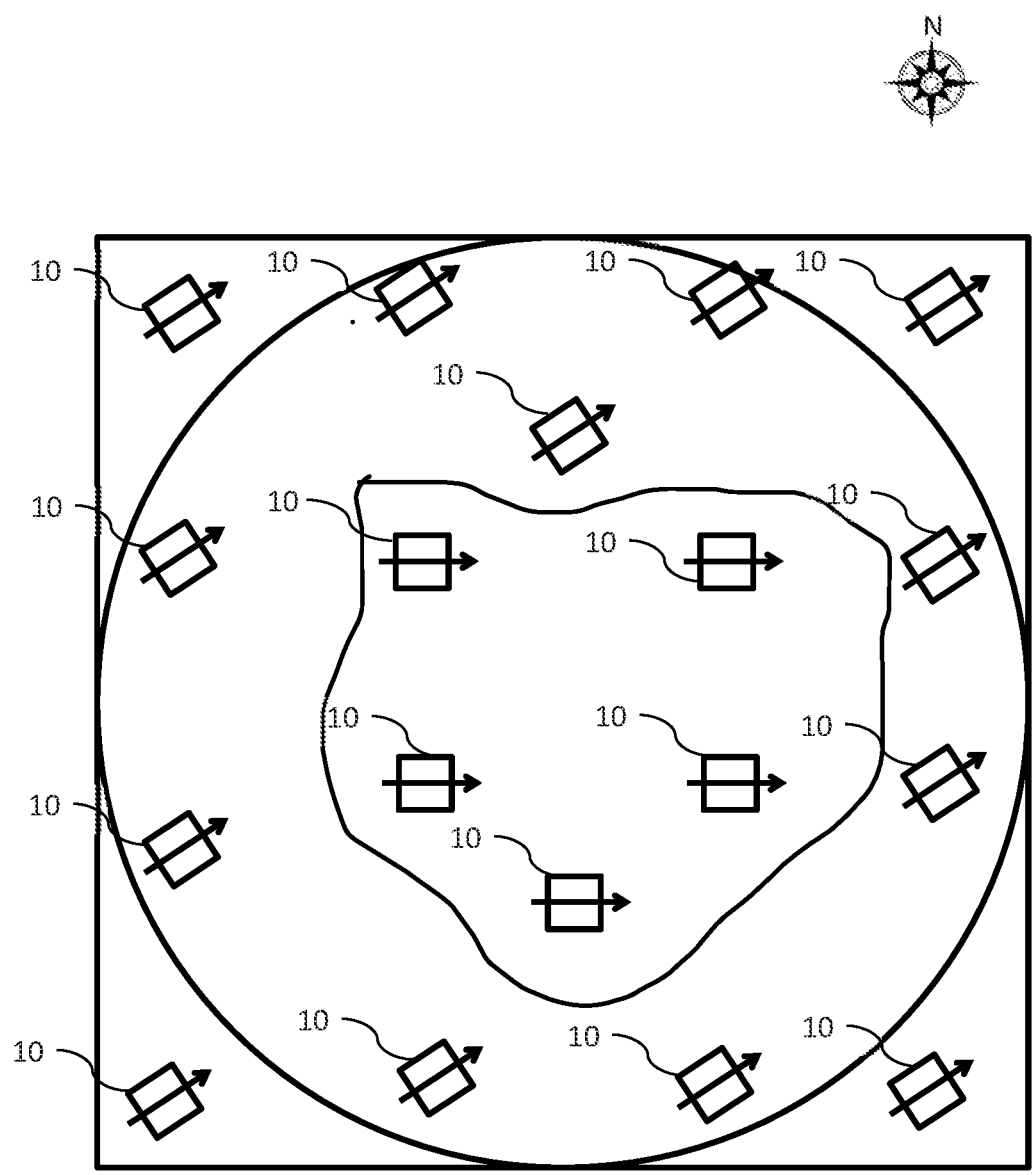
FIG. 8 is a schematic view of a field with bee shelters.

Referring to FIG. 8, a field 82 is shown with a crop 84. Crop 84 is circular to match the area that is irrigated by sprinkler equipment (not shown) that rotates about a center point in the field. Bee shelters 10 (not to scale) are positioned throughout field 82 adjacent to crops 84, with a desired orientation. If a subset of field 84, represented by line 86, is determined to have different conditions, either by measuring the conditions directly, by forecasting or estimating conditions, or based on recorded performance from prior years, the orientation of shelters 10 in subset 84 may be different than the others. While not shown, other aspects of shelters 10 may also be controlled, such as the materials, etc. as discussed above. In this manner the conditions that are favorable to support bees and their pollination activities may be improved.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A bee shelter comprising:
   a base having a top surface and a bottom surface, the bottom surface being adapted to engage a ground surface and support the top surface above the ground surface, the base defining a substantially impermeable barrier above the ground surface; and
   a collapsible structure positioned on the top surface of the base, the collapsible structure comprising:
      sidewall panels, each sidewall panel having a front edge, a top edge, and a rear edge;
      a roof panel having a rear edge, opposed side edges, a front edge, and an overhang formed between the front edge and a bend line, the overhang comprising a first aperture and a second aperture spaced between the opposed side edges;
      a rear panel having a top edge and opposed side edges;
      side hinges that connect the rear edge of each of the sidewall panels to one of the opposed side edges of the rear panel; and
      a top hinge that connects a rear edge of the roof panel to the top edge of the rear panel, the collapsible structure being foldable about the hinges between a collapsed state and an erected state, wherein:
         in the collapsed state the sidewall panels, the rear panel, and the roof panel are in a stack; and
         in the erected state the sidewall panels, the rear panel, and the roof panel define an inner cavity that has an opening defined by the front edges of the sidewall panels and the front edge of the roof panel, the inner cavity being sheltered by the roof panel, and the roof panel overlying a top edge of the sidewall panels such that the opposed side edges of the roof panel extend past the top edges of the respective sidewall panels and the top edges of the sidewall panels underly and support a bottom surface of the roof panel, the roof panel being folded along the bend line such that the overhang extends below the roof panel at an angle to define an eaves and such that the first aperture and the second aperture each receive a top corner of a respective sidewall panel, each top corner being defined by an intersection of the front edge and the top edge of the respective sidewall panel;

wherein each of the sidewall panels and the roof panel are water impermeable.

2. The bee shelter of claim 1, further comprising at least one tray support for supporting an incubation tray within the inner cavity.

3. The bee shelter of claim 1, further comprising at least one shelf adapted to support a nesting block within the inner cavity.

4. The bee shelter of claim 1, wherein at least one shelf is located on the rear panel, a nesting block is positioned on the at least one shelf, the sidewall panels are angled toward the nesting block such that front edges of the nesting block are engaged by the sidewall panels, and the nesting block is clamped in place.

5. The bee shelter of claim 1, wherein the sidewall panels, the rear panel, and the roof panel of the collapsible structure are constructed from corrugated plastic having a first layer and a second layer connected by internal corrugations, the hinges comprising a living hinge formed from an interrupted portion of the second layer adjacent to a continuous portion of the first layer.

6. The bee shelter of claim 1, wherein the roof panel is sloped relative to the base.

7. The bee shelter of claim 1, wherein a maximum height of the bee shelter is 5 feet or less.

8. The bee shelter of claim 1, wherein the base, the sidewall panels, the rear panel, and the roof panel comprise one or more thermal properties comprising a heat-absorbing color, a heat-absorbing finish, a material, a thickness, a heat capacity, a heat transfer coefficient, or combinations thereof.

9. The bee shelter of claim 8, wherein the one or more thermal properties are selected based on one or more projected environmental conditions comprising a climate, a humidity, a projected daily temperature, a latitude of the location, or combinations thereof.

10. The bee shelter of claim 1, wherein the base comprises a series of anchor points for securing the collapsible structure to the base and a ground anchor receptacle for anchoring the base to the ground surface.

11. The bee shelter of claim 1, wherein the base defines an air space between the top surface and the bottom surface.

* * * * *